(12) United States Patent
Helfman et al.

(10) Patent No.: US 9,298,428 B2
(45) Date of Patent: Mar. 29, 2016

(54) GRAPHICAL USER INTERFACE EDITOR THAT DISPLAYS LIVE DATA DURING EDITING

(71) Applicant: Keysight Technologies, Inc., Minneapolis, MN (US)

(72) Inventors: Jonathan Helfman, Loveland, CO (US); Glen L. Purdy, Loveland, CO (US); Glenn R. Engel, Loveland, CO (US)

(73) Assignee: Keysight Technologies, Inc., Santa Rosa, CA (US)

(*) Notice: Subject to any disclaimer, the term of this patent is extended or adjusted under 35 U.S.C. 154(b) by 603 days.

(21) Appl. No.: 13/779,648

(22) Filed: Feb. 27, 2013

(65) Prior Publication Data

US 2014/0245168 A1 Aug. 28, 2014

(51) Int. Cl.
*G06F 3/0484* (2013.01)
*G06F 9/44* (2006.01)

(52) U.S. Cl.
CPC ....................... *G06F 8/38* (2013.01)

(58) Field of Classification Search
CPC ......... G06F 3/00; G06F 3/048; G06F 3/0481; G06F 3/0482; G06F 9/4443; G06F 8/34; G06F 8/38; G06F 3/0484; G06F 3/0486; G06F 8/20; G06F 8/30; G06F 8/10; G06F 8/31; G06F 9/4428; G06F 9/4433; G06F 9/443; G06F 9/44521; G06F 8/54; G06F 8/71; G06F 8/24; G06G 5/14; G05B 19/0426; G05B 2219/23258; H04L 29/06; H04L 29/0809; H04L 29/08072
See application file for complete search history.

(56) References Cited

U.S. PATENT DOCUMENTS

| | | | | |
|---|---|---|---|---|
| 7,287,230 | B2 * | 10/2007 | Austin | G06F 3/0481 709/217 |
| 8,387,055 | B1 * | 2/2013 | Kuwamoto | G06F 17/212 718/102 |
| 2006/0206827 | A1 * | 9/2006 | DeWitt | G06F 9/4443 715/762 |
| 2007/0240070 | A1 * | 10/2007 | Eldridge | G05B 19/409 715/763 |

* cited by examiner

*Primary Examiner* — Xiomar L Bautista

(57) ABSTRACT

A method for operating a computer to develop a program having a GUI is disclosed. The method includes providing a program development system having an editing mode in which a user constructs a GUI and providing a graphical element that can be placed on a form as part of the GUI, the graphical element displaying data from the server while the program development system is in the editing mode. The parameters that control the connection and data transfer from the server can be provided in the properties section of the graphical element, and hence, no compilation of the underlying program is needed to verify the server connection and associated data.

16 Claims, 3 Drawing Sheets

GRAPHICAL USER INTERFACE EDITOR THAT DISPLAYS LIVE DATA DURING EDITING

BACKGROUND

A graphical user interface (GUI) for a computer program is typically developed using a programming tool that provides the user with a development system having an editing mode that allows the user to layout various display elements that are used by the program in communicating with the user. Typically, the tool provides a "canvas" or form on which the program places and sizes various graphical elements that are used in communications between the end user and the program. A graphical element may be a box that is used to provide textual input to, or output from, the program, a button that is depressed by the user during the operation of the program, etc. The programmer writes code that processes the data input through the GUI and displays the results in corresponding graphical elements in the GUI. The code is then compiled to produce a runtime system, which the programmer uses to debug the program and generate the final application for use by the end user. The programming tool typically provides the compiler and software for debugging the application and providing the final runtime program for use by the end user.

The data displayed in the GUI may be generated solely within the program during the operation of the program, may be generated by a remote source, or be a combination of the two. Some of the locally generated data may be viewable during editing. For example, if a "text box" that receives textual information from the user has a default text message that is displayed, that text message can be shown in the text box graphical element even during the editing process.

In contrast, data that is being sent by a remote source that connects to the graphical element is not viewable in the graphical element until the program is actually compiled and running. As a result, the programmer cannot verify that the remote source/data are the correct source and data without compiling and running the program. To receive data or send data to a remote source, the program typically requires three sets of instructions. The first set establishes a connection between the program and remote source. The second set requests the data stream that is to be sent to the program, and the third set receives the data and displays it in the graphical element, with or without, further processing. The programmer needs to generate each of these sets correctly to just get the graphical element to display the data stream from the remote server. This process is tedious and error prone.

The connection sequence is particular to the server that is providing the data. The connection sequence typically requires user names and passwords encoded in a particular manner as well as an address that is used to access the server. The message in which the authorization information is provided is typically different for different servers. While the messages are often some form of text string, the format of the string will vary from source to source. If the string is incorrect, the programmer will typically just receive a message that the connection failed. The instructions in the second set of instructions also typically requires a text string that is different for different applications. If the programmer gets the string wrong, the programmer is again sent a message that the request failed with little or no information that allows the programmer to determine why the request failed. Finally, if the data stream is received but in a different format than the programmer anticipated, the programmer must determine if the stream has the desired data and figure out why the data is in the unanticipated format.

As a result of these complexities, the process of setting up a graphical element to display a remote data source often requires numerous passes in which the programmer modifies one of the instruction strings, recompiles the program and runs the program in a debug mode. Each time the stream fails, the user must adjust the strings and try again. The process is time consuming and frustrating. To reduce this complexity, various programming platforms provide tools for specific common server connections such as graphical elements that connect to a particular type of database and display data from a known table in that database. However, even with these tools, the user must compile and run the program to determine if the correct data stream is being received and displayed in the desired manner. Often, the program in question includes various other components that must be debugged before the portion that connects to the remote server and displays that data is written and debugged. This further complicates the problem of dealing with a remote data source, as errors in the other code can also interfere with the code dealing with the remote server.

SUMMARY

The present invention includes a method for operating a computer to develop a program having a GUI. The method includes providing a program development system having an editing mode in which a user constructs a GUI and providing a graphical element that can be placed on a form as part of the GUI, the graphical element displaying data from the server while the program development system is in the editing mode.

In one aspect of the invention, the graphical element includes a set of properties that control a connection between the GUI and the server. The user defines the properties in the editing mode and the program development system provides an error message if the graphical element fails to connect to the server using the user defined properties.

In another aspect of the invention the graphical element includes a set of properties that control a connection between the GUI and the server, and the program development system causes the graphical element to connect to the server when the set of properties is changed by the user and the program development system is in the editing mode.

In yet another aspect of the invention the graphical element includes a set of properties that control a connection between the GUI and the server, and the program development system causes the graphical element to connect to the server when a specified one of a set of properties is changed by the user while the program development system is in the editing mode.

In a still further aspect of the invention, the server provides a data stream which is displayed in a graphical element. The data stream includes a value that changes with time and the graphical element displays a quantity related to the value as a function of time. In one embodiment, the graphical element updates the display of the quantity each time a new value is received from the server.

In another aspect of the invention, the server controls an instrument whose function depends on parameters sent by the graphical element, and the development system updates one of the parameters when a corresponding property associated with the graphical element is updated and the development system is in the editing mode.

DETAILED DESCRIPTION

Figure 1:
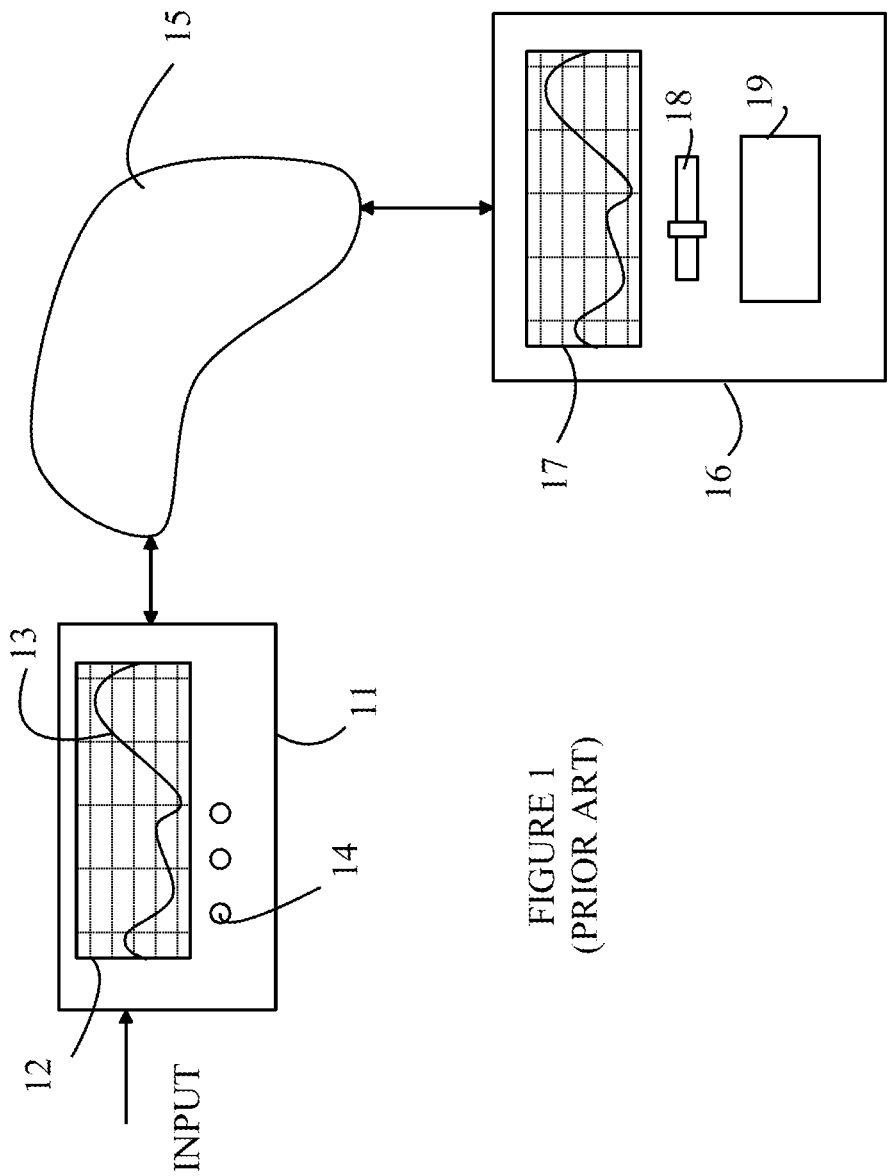
FIG. 1 illustrates the remote control of an instrument over a network.

The manner in which the present invention provides its advantages can be more easily understood with reference to FIG. 1 which illustrates the remote control of an instrument over a network. In this example, instrument 11 is an oscilloscope that measures and displays the amplitude of an input signal as a function of time and displays the results in a window 12 as a curve 13. The various parameters that determine the display and measurement are set with controls 14. Instrument 11 also includes a server that connects instrument 11 to a network 15 that could include public links such as links on the Internet. A remote computing device 16 is coupled to network 15 and runs a program for monitoring the output of instrument 11 and altering the control setting of instrument 11. The output of instrument 11 is displayed in a graphical window 17. The various parameters that control the operation of instrument 11 are provided as graphical elements such as slider 18. The program running on remote computing device 16 may also include various data reduction programs that provide outputs and/or inputs through other elements in the GUI on remote computing device 16 such as window 19. Remote computing device 16 could be a mobile computing platform such as a smart phone, tablet, or laptop computer or a stationary work station.

The program running on remote computing device 16 is typically generated with the aid of a programming tool that provides an editor that is used for generating the GUI for the program and the code for implementing that GUI. The present invention is based on the observation that designing and debugging a GUI that receives and displays data from a remote data source would be significantly simplified if the programming environment displayed the data "live" in the corresponding graphical element while the programming environment was in the editing mode. With such a function, the programmer can place a graphical element on the form, specify the connection details, and view the data from the source in the graphical element without having to compile the entire program and run the program in a debug mode. In addition, the connection and results can be viewed without the need to write and compile other portions of the program.

The connection string is typically part of the properties of the graphical element. If the connection string entered by the programmer in the properties section of the graphical element is incorrect, the connection failure is immediately evident, as the development system editor can notify the user that the connection failed and provide the details of any error message generated in the attempted connection. The programmer can then try an alternate string, etc. Once the connection is correctly made, the programmer can provide the additional configuration strings required to request the desired data. The remote server will then provide the data stream to the graphical element, which will in turn display the data in the graphical element. The programmer can then go on to write and debug other portions of the program.

Figure 2:
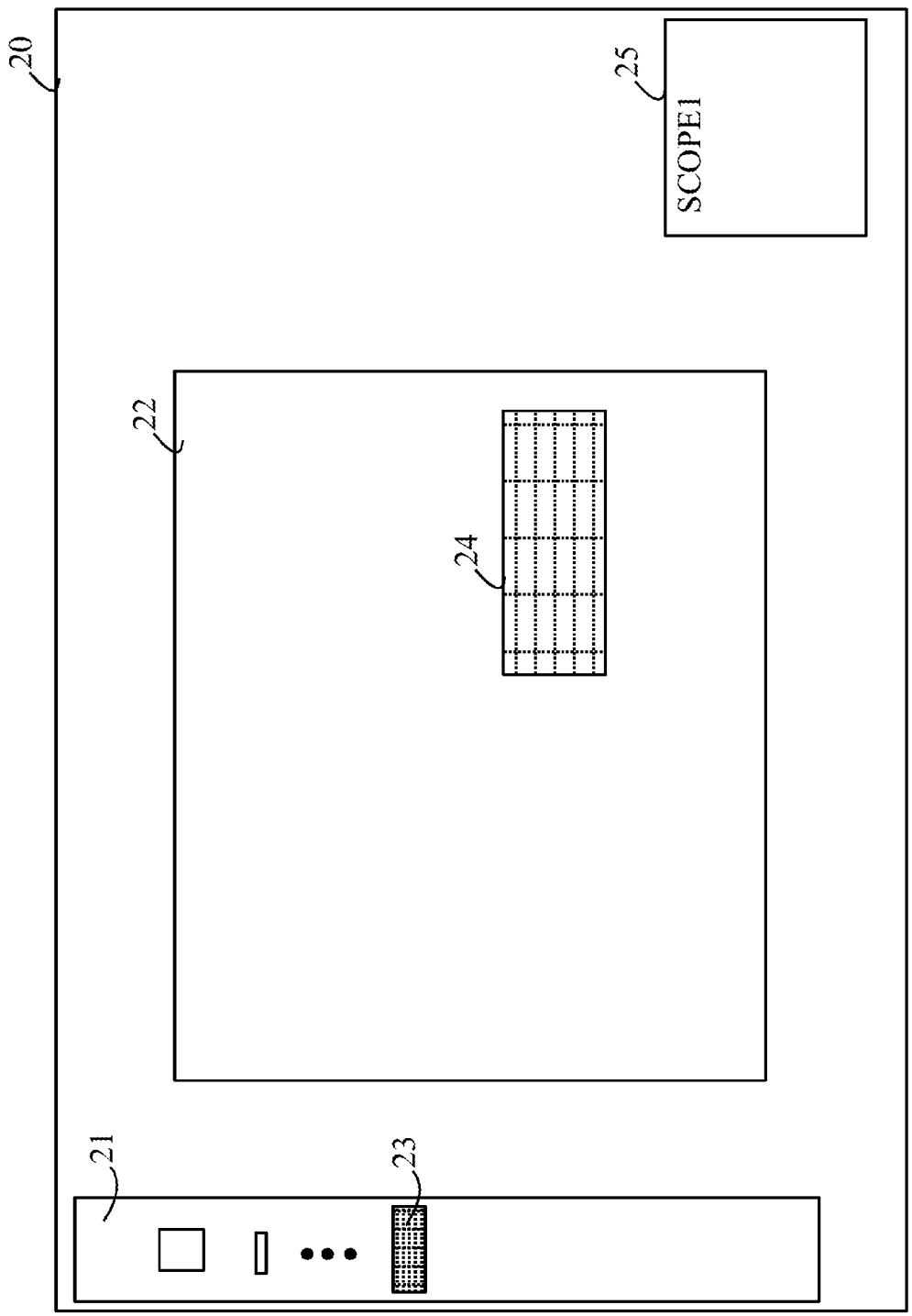
FIG. 2 illustrates a form for a program that utilizes a graphical element that represents an oscilloscope display according to one embodiment of the present invention.

Refer now to FIG. 2, which illustrates a form for a program that utilizes a graphical element that represents an oscilloscope display according to one embodiment of the present invention. Form 22 typically is part of a display in the program development environment 20 in which various graphical elements from a toolbox 21 can be dragged onto form 22 and positioned so that the graphical elements will be in their desired place during the running of the program. The various graphical elements in toolbox 21 can be supplied by the program development environment source or by a third party. A typical graphical element 23 that has been dragged from toolbox 21 to form 22 is shown at 24. The development system provides a name for the graphical element and typically provides a table having the various properties of the graphical element with the default values for those properties in a separate window, such as table 25, which appears when graphical element 24 is selected. In the current example, graphical element 24 is an oscilloscope graphical element that displays signals measured on a remote oscilloscope. The development system has assigned the graphical element a name of "SCOPE1" and created a properties table 25 corresponding to that instance of the graphical element. In the present example, graphical element 24 displays data from a remote server, and hence, includes information for making the connection to the remote server and providing the necessary commands to elicit the data that is to be displayed in graphical element 24.

If the graphical element is intended to connect to an instrument provided by a third party, that third party can provide the graphical element component for the programming environment. In this case, the connection string needed to access the server function of that instrument can be built into the properties of the graphical element in a manner that minimizes the amount of information that the programmer must supply to actually make a connection. For example, the properties of the graphical element could include places for providing a user name, password, and IP addresses for the remote server. The code associated with the graphical element could then use this information to construct a connection string that will be sent to the server to initiate the connection between the server and the graphical element.

If the graphical element is a more generic element than is provided by the entity that provides the programming environment, the amount of information that must be provided to construct a connection string and the form of that connection string could be considerably more complex. In addition, the specific form of the connection string must also be determined.

Figure 3:
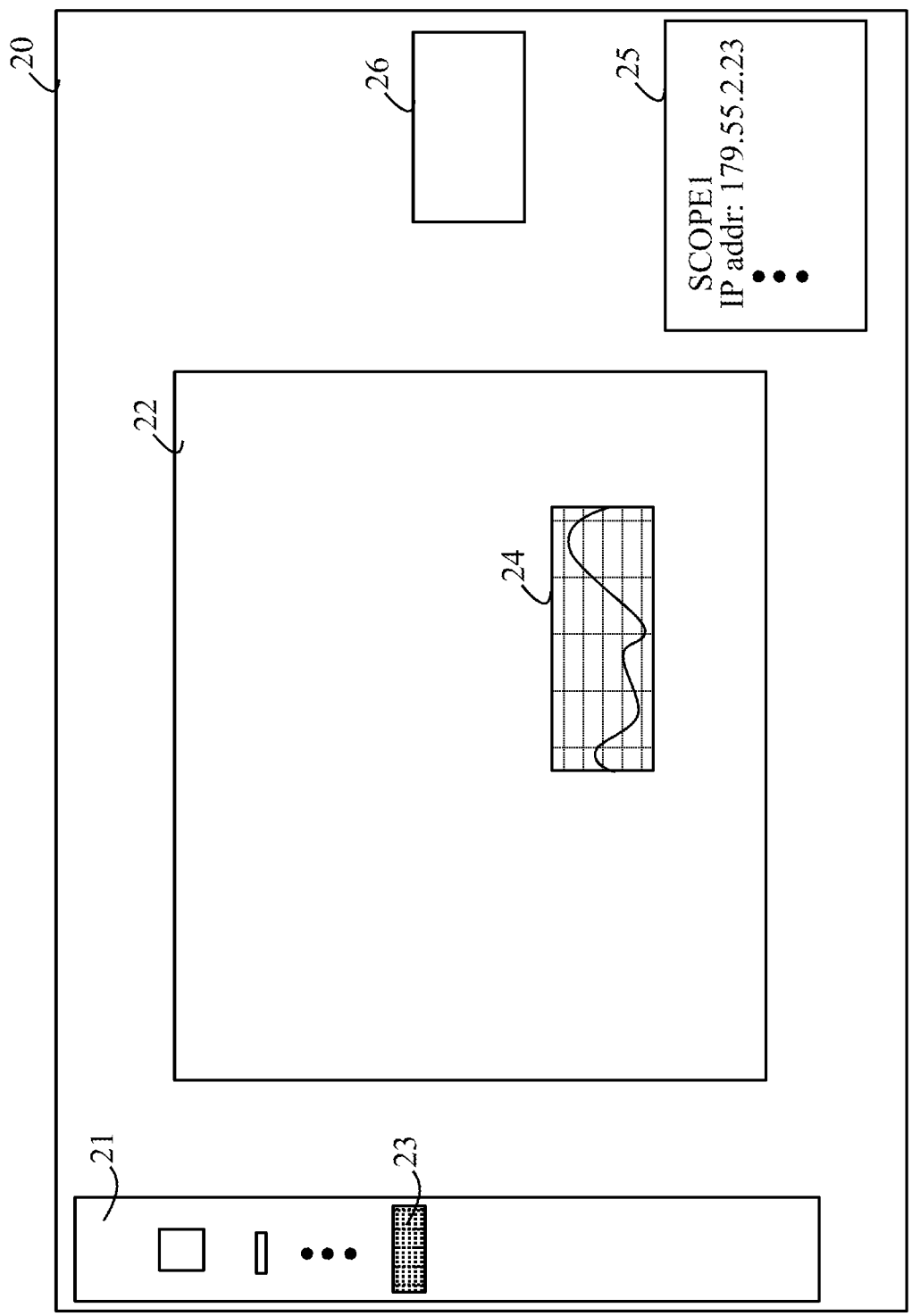
FIG. 3 illustrates the view of the development environment after the programmer has entered the information specifying the connection into the properties dialog box for the graphical element.

Refer now to FIG. 3, which illustrates the view of program development environment 20 after the programmer has entered the information specifying the connection into the properties dialog box 25 for graphical element 24. Initially, when graphical element 24 is placed on form 22, graphical element 24 is not connected to any data source, and hence, no signals are displayed in graphical element 24. Once graphical element 24 is placed on the form and, the parameters associated with graphical element 24 that are needed to connect graphical element 24 to the desired remote server are specified, the programming environment of the present invention initiates the desired connection and begins to display the received data in graphical element 24 even while the programming environment is in the editing mode.

If the connection fails, the programming environment provides an error message at the time of failure. For example, the programming environment can generate a popup window such as window 26 which provides the status of the attempt to connect to the server associated with graphical element 24. Since the failure occurs while the programming environment is in an editing mode, the programmer can examine the connection information and make corrections. In one aspect of the invention, each time the connection properties of the graphical element are updated, the programming environment re-connects to the server associated with the graphical element.

The present invention significantly reduces the programming effort for building GUIs for programs that involve multiple server connections. The present invention allows the programmer to setup each server connection independently of the underlying code that runs the GUI in the finished program. Hence, while the programmer places the individual graphical elements corresponding to each server connection on the form, the programming environment makes the connections, and the programmer can view the resultant data to verify that the data is consistent with the expected data from that server. These server connections can be set up before the programmer writes code for the remainder of the GUI. Since the server connections often present one of the most difficult parts of the overall program, writing and debugging the remaining code is significantly simplified in a significant number of applications.

The present invention is particularly well suited for programming environments in which the graphical elements represent data streams from known commercial instruments or servers that have graphical elements associated with the instrument or server that provide a view of a particular type of data. In one aspect of the invention, the supplier of the instrument or server provides the graphical element in a form that is easily added to the toolbox of the programming environment of the present invention. The graphical element is preferably an object that has properties that provide the connection information in a predetermined format that is easily understood by the programmer. For example, properties that specify the user name, password, IP address and port in string form could be provided. The connection "message" would then be generated by the graphical element itself prior to actually attempting the connection, thus relieving the programmer of the task of determining the connection message and any special encoding needed within the message.

In another aspect of the invention, an object that encapsulates command, control and display aspects of a particular remote instrument is provided to the editing platform. This object would be associated with a particular type of data stream that would then become live once the object is placed into the editing panel of the programming environment. The objects in question could be part of the programming platform or supplied by a third party such as the manufacturer of the remote instrument.

In one aspect of the invention, the programmer makes a separate connection to the server that provides the login information. This connection can be made either from the programming platform or in a separate communication between the programmer and the server. Once the connection has been established, the programming environment can make the connection to the graphical element using a simpler inter-process communication mechanism. Once the login is completed, the programmer can see a list of all of the live data sources on the server. In this case, the programmer drags a data source into the editor and a default graphical element would automatically be instantiated and connect to the data source to show the live data. If a different graphical element is desired, the programmer can place that element on the form, and the live data would then re-connect with the new graphical element.

For example, the programmer could make a single connection to a service that provides access to a dynamically-changing set of data streams. The implementation details of the remote service are hidden from the programming platform whether they are implemented underneath using multiple client/server connections or a single inter-process communication mechanism. Once the single connection has been established, the programmer can see a list of all of the live data sources on the server. In this case, the programmer drags a data source into the editor and a default graphical element would automatically be instantiated and connect to the data source to show the live data. If a different graphical element is desired, the programmer can place that element on the form, and the live data would then re-connect with the new graphical element. As new data streams become available to the service, they would become a visible list of live data sources automatically.

In another aspect of the invention, the server provides a "help" message that provides the information needed by the programmer to set up the parameters that are needed by the connection properties. This help message is a generic help system message that is used by multiple servers in a class of servers that are optimized for incorporation into GUIs with the present invention. In this aspect of the invention, the programmer enters a property that indicates that help is needed and enters the IP address and port of the server. As soon as this information is entered, the graphical element attempts a connection to the server at that address and port. A successful connection provides a "data stream" that is a string with the details of how to connect to the server for various server functions. The programmer can then use this information to determine how to set the properties for the graphical element such that the graphical element will connect to the desired data stream from that server. Since the connection is made while the programming environment is in the edit mode, the programmer can obtain the help information for any particular server or instrument without having to access a website for the provider of the service or instrument.

In another aspect of the invention, the programming environment generates the help message when a connection fails with the assistance of the remote server. If a connection fails using the address in the properties table, the programming environment queries the connection to determine if a server is at the entered address by pinging that address. If the address returns the ping, the programming environment sends a generic help message to the same address. For example, the programming environment could send a message with a "?" to the server. If the server recognizes the default help message, the server returns a string with information on making a connection. If the server does not recognize the message, the connection will fail a second time, and the programmer will need to determine the cause of the failure.

In the above described embodiments, the graphical element automatically connects with the server or instrument when the properties of that graphical element are changed. However, the programmer may wish to have more control over the timing of the connection. In one aspect of the present invention, the graphical element has a property that determines when an attempt is made to connect to the server. This property can include modes in which the connection is attempted as soon as the properties of the graphical element change. In another option associated with this property, a connection is only attempted when the property in question is set to a state indicating an immediate connection is to be attempted using the current properties of the graphical element. In yet another mode, the connection is not attempted in editing mode.

The present invention also includes a computer readable medium that stores instructions that cause a data processing system to execute the method of the present invention. A computer readable medium is defined to be any medium that constitutes patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a computer to develop a program having a GUI, said method comprising:
   providing a program development system having an editing mode in which a user constructs a GUI; and
   providing a graphical element that can be placed on a form as part of said GUI, said graphical element displaying data from a server while said program development system is in said editing mode.

2. The method of claim 1 wherein said graphical element comprises a set of properties that control a connection between said GUI and said server, said user defining said properties in said editing mode, said program development system providing an error message if said graphical element fails to connect to said server using said user defined properties.

3. The method of claim 1 wherein said graphical element comprises a set of properties that control a connection between said GUI and said server, said program development system causing said graphical element to connect to said server when said set of properties is changed by said user and said program development system is in said editing mode.

4. The method of claim 1 wherein said graphical element comprises a set of properties that control a connection between said GUI and said server, said program development system causing said graphical element to connect to said server when a specified one of a set of properties is changed by said user and said program development system is in said editing mode.

5. The method of claim 1 wherein said server provides a data stream which is displayed in a graphical element.

6. The method of claim 5 wherein said data stream includes a value that changes with time and said graphical element displays a quantity related to said value as a function of time.

7. The method of claim 6 wherein said graphical element updates a display of said quantity each time a new value is received from said server.

8. The method of claim 1 wherein said server controls an instrument whose function depends on parameters sent to said graphical element, and wherein said program development system updates one of said parameters when a corresponding property associated with said graphical element is updated and said program development system is in said editing mode.

9. A computer readable medium comprising instructions that cause a data processing system to execute a method for developing a program having a GUI, said method comprising:
   providing a program development system having an editing mode in which a user constructs a GUI; and
   providing a graphical element that can be placed on a form as part of said GUI, said graphical element displaying data from a server while said program development system is in said editing mode.

10. The computer readable medium of claim 9 wherein said graphical element comprises a set of properties that control a connection between said GUI and said server, said user defining said properties in said editing mode, said program development system providing an error message if said graphical element fails to connect to said server using said user defined properties.

11. The computer readable medium of claim 9 wherein said graphical element comprises a set of properties that control a connection between said GUI and said server, said program development system causing said graphical element to connect to said server when said set of properties is changed by said user and said program development system is in said editing mode.

12. The computer readable medium of claim 9 wherein said graphical element comprises a set of properties that control a connection between said GUI and said server, said program development system causing said graphical element to connect to said server when a specified one of a set of properties is changed by said user and said program development system is in said editing mode.

13. The computer readable medium of claim 9 wherein said server provides a data stream which is displayed in a graphical element.

14. The computer readable medium of claim 13 wherein said data stream includes a value that changes with time and said graphical element displays a quantity related to said value as a function of time.

15. The computer readable medium of claim 14 wherein said graphical element updates a display of said quantity each time a new value is received from said server.

16. The computer readable medium of claim 9 wherein said server controls an instrument whose function depends on parameters sent to said graphical element, and wherein said program development system updates one of said parameters when a corresponding property associated with said graphical element is updated and said program development system is in said editing mode.

* * * * *